No. 753,383. Patented March 1, 1904.

UNITED STATES PATENT OFFICE.

OSKAR FRANK, OF DETROIT, MICHIGAN, ASSIGNOR TO LEVI J. LENNOX AND MICHIGAN STORAGE BATTERY CO., OF DETROIT, MICHIGAN, A CORPORATION OF MICHIGAN.

PROCESS OF PREPARING ELECTRODES FOR STORAGE-BATTERY CELLS.

SPECIFICATION forming part of Letters Patent No. 753,383, dated March 1, 1904.

Application filed May 2, 1903. Serial No. 155,299. (No specimens.)

*To all whom it may concern:*

Be it known that I, OSKAR FRANK, a citizen of the United States of America, residing at Detroit, in the county of Wayne and State of Michigan, have invented certain new and useful Improvements in Processes of Preparing Electrodes for Storage-Battery Cells, of which the following is a specification, reference being had therein to the accompanying drawings.

This invention relates to the process of preparing lead electrodes for storage-battery cells, and has for its object to treat the plate before it is filled with the active material and finally charged so as to properly prepare the plate itself, thus giving a much wider range of capacity to the plate and insuring its longevity.

As an electric accumulating-battery is efficient only when the lead grids have become porous to a certain extent, I propose to subject the electrodes to the following treatment: I first form an electrolyte by mixing with ninety-five per cent. of $H_2O$ five per cent. of $Na_2SO_4$ and .7 per cent. of $KClO_3$. In this electrolyte the grid-form plates or electrodes are placed, preferably, parallel to each other in any desired number. Generally eleven plates are placed in one receptacle standing parallel, those facing one way, usually five, are positive plates, and the six others alternating with these, facing the opposite way, the negative plates. A current of strength of one ampere is sent through this series of plates for fifty hours, more or less, with temperature at about 20° centigrade. Through this treatment the positive plates are covered with chlorin, which can be noticed by the white coat with which the plates are covered. This white coat, however, gives way in a short time to a dark-brown color. This process is continued for the full length of time, as above mentioned, at the end of which time the positive plates will have been penetrated to the depth of one millimeter. Then the plates are removed from the electrolyte and thoroughly washed in distilled water. I then put the positive plates into a weak solution of $H_2SO_4 + H_2O$. This removes the chlorin, and in order to remove all the chlorin I use the positive as negative plates and substitute sheets of lead for the positive plates and connect up as before, then charge with a current of two amperes strength for about fifty hours, at the end of which time the so valuable and capacity-increasing element peroxid appears. The brownish color of the plates is replaced by a grayish spongy coating. After the plates which have been subjected to this treatment are taken out of the last mixture and all HCl removed by thoroughly washing in distilled water the plates are dried in air with temperature at about 300° centigrade, preferably the air-current from the kettle in which the metal for the plates is being melted. This gives the plate a solid coating of lead superoxid. The plate is then taken for a practical positive-pole plate, and after the active material has been introduced into the plate and, together with the negative-pole plate, goes to make up a cell.

This chemical process for the preparation of electrodes for storage-battery cells enables me to get such high capacity as has heretofore never been possible to produce. The long life of this plate is not to be found in any other plate and the weight of the electrodes reduced at least twenty-five per cent. Through this preparatory process a battery is made which according to the fundamental laws of chemistry and electrochemistry differs in every aspect from any other now known, and these cells can be charged in an amazingly short time with a strength of current of from forty to fifty amperes, such as would destroy any other cell of its kind.

Having thus fully described my invention, what I claim is—

1. The herein-described process for treating battery plates or grids, which consists in first immersing the plates in an electrolyte, then passing a current of one-ampere strength through the plates for about fifty hours, more or less, at a temperature of about 20° centigrade; then removing the plates and placing in a weak solution of $H_2SO_4 + H_2O$ and using the positive for the negative plates and lead sheets for the positive plates; then connecting them up and charging with a current of two-ampere strength for about fifty hours, more or less and then remove, wash and dry at the temperature of about 300° centigrade.

2. The herein-described process for treating battery plates or grids, which consists in first immersing the plates in an electrolyte; then passing an electric current of about one-ampere strength through the plates for about fifty hours, at a temperature of about 20° centigrade; then removing the plates and wash with distilled water and place in a weak solution of $H_2SO_4+H_2O$ then using the positive for the negative plates and lead sheets for the positive plates and connect up and charge with a current of about two-ampere strength for about fifty hours and then remove and wash with distilled water and dry at the temperature of about 300° centigrade.

3. The herein-described process of treating battery plates or grids, which consists in first immersing the plates in an electrolyte and passing an electric current of one-ampere strength through the plates for about fifty hours at a temperature of about 20° centigrade; then removing the plates from the electrolyte and placing the positive plates in a weak solution of $H_2SO_4+H_2O$ then using the positive for the negative plates and sheets of lead for the positive plates while in this solution and connecting them up and charging with a current of two-ampere strength for about fifty hours; then removing from the mixture and washing with distilled water and drying in a temperature of about 300° centigrade.

4. The herein-described electrochemical process for making lead electrodes for storage-battery cells, which consists in first immersing the electrodes in an electrolyte consisting of ninety-five per cent. of $H_2O$, five per cent. of $Na_2SO_4$ and .7 per cent. of $KClO_3$; then passing an electric current of one-ampere strength through the electrodes for fifty hours at a temperature of 20° centigrade; then remove the plates and place the positive plates in a weak solution of $H_2SO_4+H_2O$ and use the positive for the negative plates and sheets of lead for the positive plates then connect them up and charge with a current of two-ampere strength for fifty hours, the plates are then removed from this last mixture and all HCl removed by thoroughly washing in distilled water and then dried at the temperature of 300° centigrade.

5. The herein-described electrochemical process for making lead electrodes for storage-battery cells, which consists in first immersing the electrodes in an electrolyte consisting of ninety-five per cent. of $H_2O$, five per cent. of $Na_2SO_4$ and .7 per cent. of $KClO_3$; then passing an electric current of one-ampere strength through the electrodes for about fifty hours at a temperature of 20° centigrade; then removing the plates from the electrolyte thoroughly washing with distilled water and placing the positive plates in a weak solution of $H_2SO_4+H_2O$ then using the positive for the negative plates and lead sheets for the positive plates while in this solution and connecting them up; then charging with a current of two-ampere strength for about fifty hours; then removing from this mixture and removing all HCl by washing in distilled water and then drying with a current of air charged with lead fumes at a temperature of about 300° centigrade.

In testimony whereof I affix my signature in presence of two witnesses.

OSKAR FRANK.

Witnesses:
 THOMAS G. LONGSTAFF,
 OTTO F. BARTHEL.